(12) United States Patent
Koch

(10) Patent No.: US 8,650,702 B1
(45) Date of Patent: Feb. 18, 2014

(54) SPRING FOR WINDSHIELD WIPER ASSEMBLIES

(71) Applicant: Jean Koch, Brossard (CA)

(72) Inventor: Jean Koch, Brossard (CA)

(*) Notice: Subject to any disclaimer, the term of this patent is extended or adjusted under 35 U.S.C. 154(b) by 0 days.

(21) Appl. No.: 13/689,741

(22) Filed: Nov. 29, 2012

(51) Int. Cl.
*B60S 1/32* (2006.01)
*B60S 1/34* (2006.01)

(52) U.S. Cl.
USPC ............... 15/250.351; 15/250.202; 267/154; 267/155

(58) Field of Classification Search
USPC ............ 15/250.2, 250.351, 250.352, 250.34; 16/295, 304, 307, 308; 267/154, 155, 267/273, 275, 279, 166
See application file for complete search history.

(56) References Cited

U.S. PATENT DOCUMENTS

| | | | | |
|---|---|---|---|---|
| 2,660,748 A | * | 12/1953 | Gaumer | 15/257.01 |
| 2,885,710 A | * | 5/1959 | Brasty | 15/257.01 |
| 5,320,333 A | | 6/1994 | Koch | |
| 6,804,855 B2 | | 10/2004 | Lebel | |
| 6,931,691 B1 | | 8/2005 | Ward | |

* cited by examiner

*Primary Examiner* — Gary Graham

(57) ABSTRACT

A spring for windshield wiper assemblies is comprised of a resilient rod having a plurality of sections adapted to removably attach to a windshield wiper assembly of a vehicle. The rod includes a first hook section at one end section thereof; a second hook section located at an opposite end section thereof. An intermediate coiled section attached to and located adjacent the first hook section, and a connector section defining an axis along its length and connected between the intermediate coiled section and the second hook section.

8 Claims, 10 Drawing Sheets

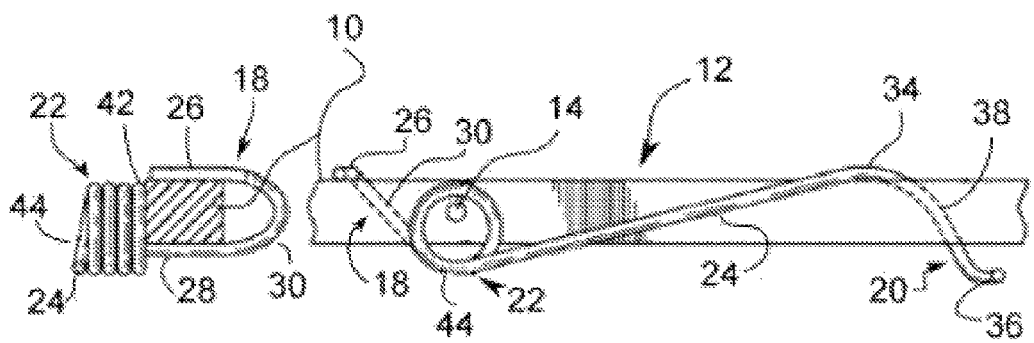
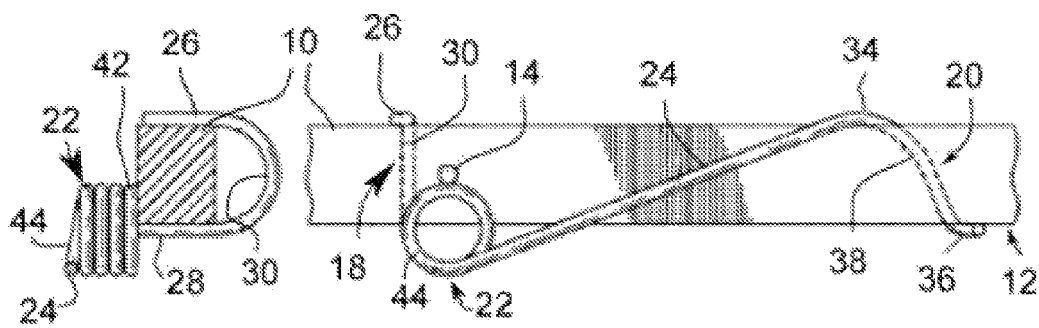
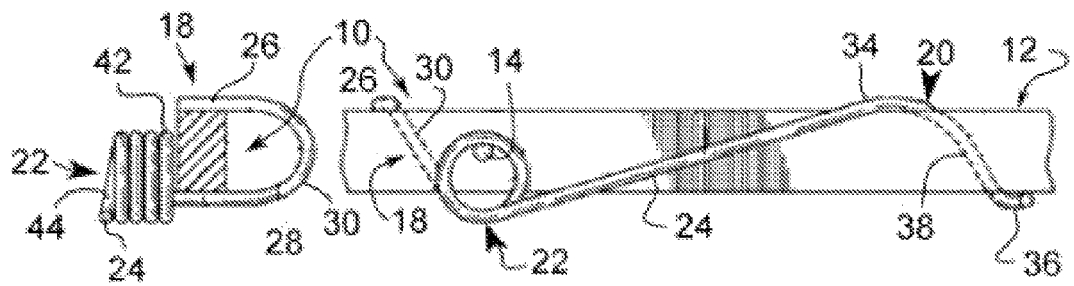
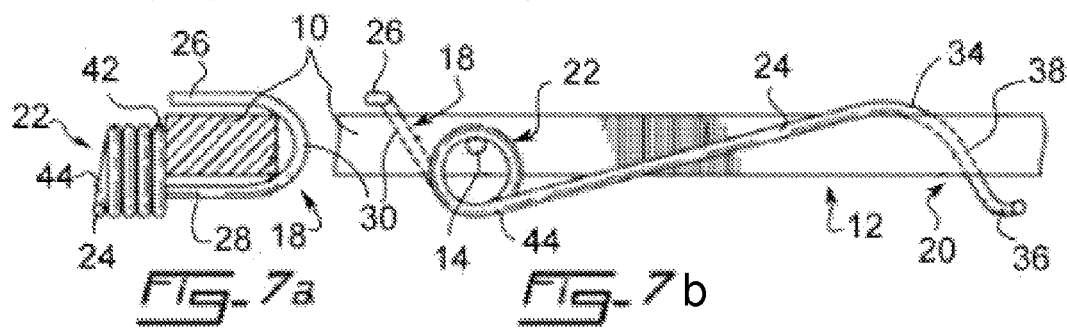

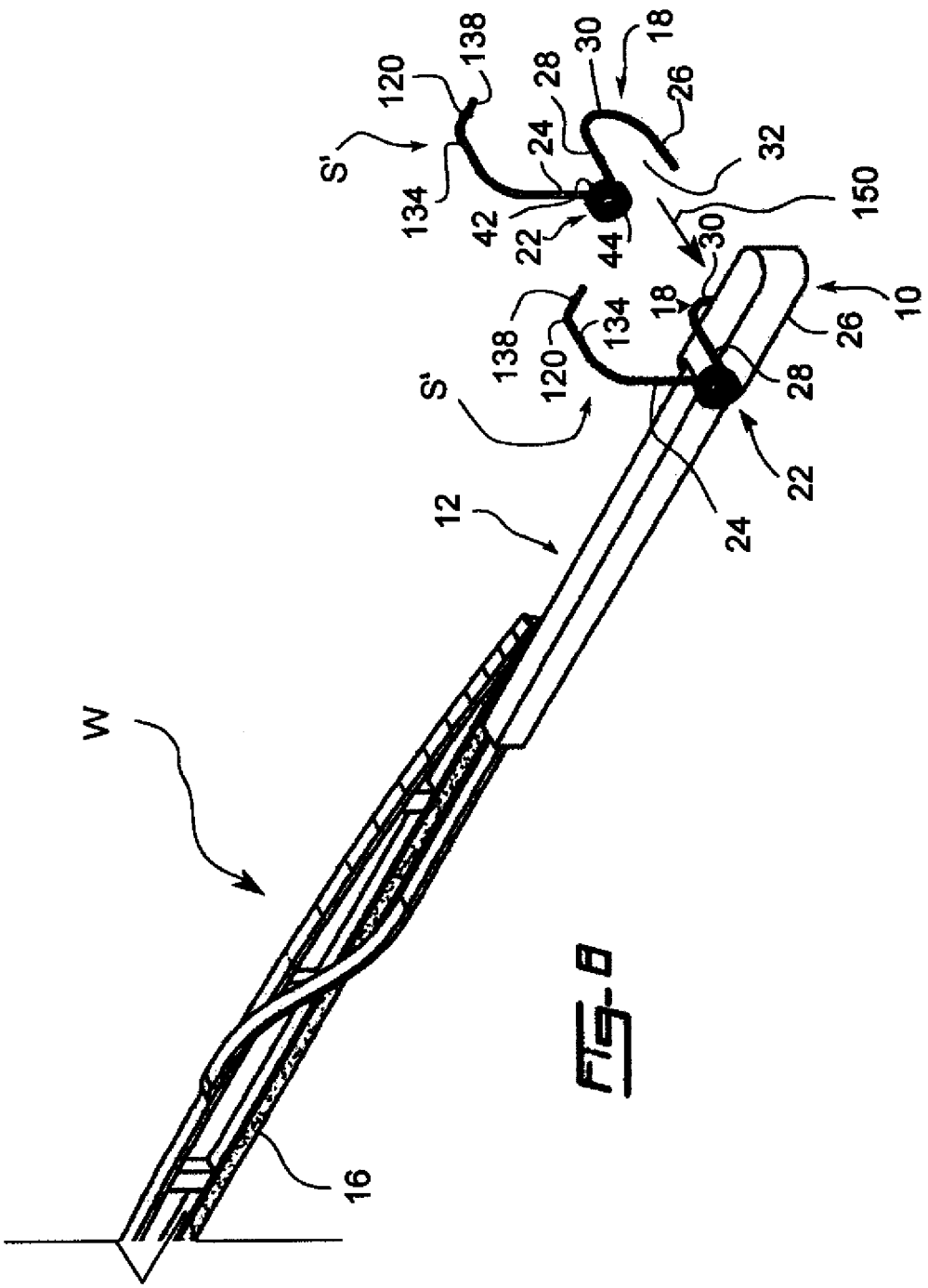

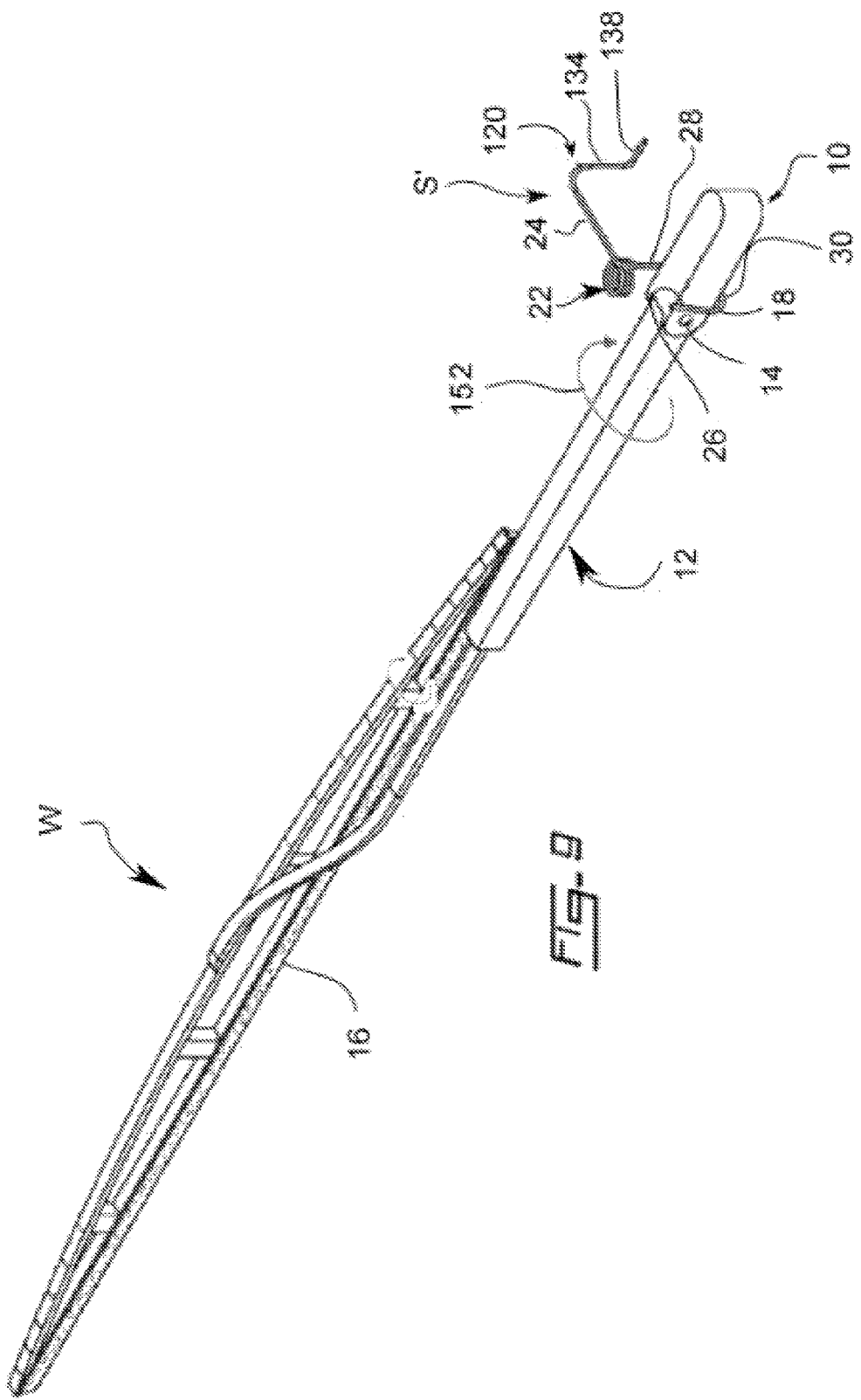

SPRING FOR WINDSHIELD WIPER ASSEMBLIES

FIELD OF THE INVENTION

The present invention relates generally to the windshield wiper assemblies used on various vehicles and, more particularly, to devices adapted to apply force on wiper arms for increased pressure thereof on outside surfaces of windshields.

BACKGROUND OF THE INVENTION

Windshield wiper assemblies for motor vehicles basically include a drive shaft mounted on the vehicle body, below the windshield, and a drive arm mounted on the drive shaft for rotation therewith. The windshield wiper assembly also includes a wiper arm that is hingedly mounted to the drive arm and that carries a wiper blade adapted to be in contact with the windshield. The drive arm and the wiper arm are spring loaded such that the wiper arm and thus the wiper blade are urged into contact with the windshield. Typically, a helical spring extends between the drive arm and the wiper arm with the hinge connecting the drive arm and the wiper arm being located between the attachment points of the helical spring thereto. The drive shaft when actuated imparts a back-and-forth movement to the drive arm and thus to the wiper arm thereby causing the wiper blade to clear the windshield of rain, snow, and the like. Such an arrangement is also used for the wiper assemblies of rear windows of certain vehicles, such as hatchbacks, vans and SUVs.

Therefore, windshield wiper assemblies on vehicles are biased towards the windshield so that the wiper blade exerts a certain pressure against the windshield. Generally the wiper arm does not sit very high off the windshield and the helical tension spring that is stretched between the drive arm and the wiper arm does not have sufficient space to exert a long moment arm thus creating weak pressure on the wiper blade compared to the force exerted by the spring since it is working in tension with a short moment arm. Nevertheless, the spring must be extremely strong so as to create a sufficiently strong torque to generate a good pressure on the wiper blade so that in turn the blade gives a satisfactory wiping action against the windshield. However, wiper assemblies do not always maintain sufficient contact of the wiper blade against the windshield being wiped to keep the latter clean.

Moreover, as generally encountered at high vehicle speeds or when vehicle is facing strong winds, wind lift on the wiper arm and blade counteracts at least some of the force exerted by the spring thereby reducing the wiping action of the wiper blade in an unsatisfactory manner.

Accordingly, vehicle aftermarket products have been developed for increasing the wiping pressure of the wiper blade on the windshield. Such products are typically fitted onto the wiper assembly to increase the spring force acting on the wiper arm such as to provide better contact between the wiper blade and windshield being wiped.

There thus exist different types of devices that can be mounted onto windshield wiper assemblies so as to at least partly oppose a lifting effect of the wiper arm from the windshield when the assembly is in operation. Examples of such devices are disclosed, for example, in U.S. Pat. Nos. 2,782,450 (issued on Feb. 26, 1957 to Nesson); 2,885,710 (issued on May 12, 1959 to Brasty); 5,320,333 (issued on Jun. 14, 1994 to Koch); 6,804,855 B2 (issued on Oct. 19, 2004 to Lebel); and 6,931,691 B1 (issued on Aug. 23, 2005 to Ward); as well as in U.S. Patent Application Publication No. 2008/0155777 A1 in the name of Stull.

Though these devices allow for the wiper blade of a windshield wiper assembly to be in contact with the windshield of the vehicle, they may not fit on all existing types of windshield wiper assemblies and, more particularly, on the drive arm and wiper arm thereof. Indeed, there are multiple windshield wiper assembly models that are of different dimensions, whereby various sizes and configurations of these aftermarket devices may be required to properly fit these different wiper assemblies. For instance, the spring device of U.S. Pat. No. 5,320,333 has been manufactured in four different sizes so that the hook-like end portions thereof can be appropriately mounted to the drive arm and wiper arm of various models of windshield wiper assemblies.

There is thus still a need for a device for windshield wiper assemblies, which can be engaged onto many windshield wiper assembly models, i.e. which are of different sizes and/or shapes, and which increases the pressure of the wiper blade onto the windshield for providing a better contact between the wiper blade and the surface being wiped.

SUMMARY OF THE INVENTION

In view of the foregoing disadvantages inherent in the known devices now present in the prior art, the present invention, which will be described subsequently in greater detail, is to provide objects and advantages which are:

To provide for a novel spring for windshield wiper assemblies.

In order to do so, the invention consists of a specially configured and sized rounded and curved shape which allows it to be fitted on all types of wiper assemblies.

It is comprised of a resilient rod having a plurality of sections adapted to removably attach to a windshield assembly wiper of a vehicle, the rod includes a first hook section at one end section thereof; a second hook section located at an opposite end section thereof; an intermediate coiled section attached to and located adjacent the first hook section; and a connector section defining an axis along its length and connected between the intermediate coiled section and the second hook section.

The first hook section is substantially U-shaped and is adapted to removably attach to a drive arm of the windshield wiper assembly. The second hook section has a convoluted U-shape and is adapted to removably attach to a wiper arm of the windshield wiper assembly, and wherein the rod is bent such that the first and second hook sections are adapted to be placed on a first side of the windshield wiper assembly, the intermediate coil is adapted to be placed on a second side of the windshield wiper assembly opposite the first side, and the connector section being adapted to be placed on a third side of the windshield wiper assembly in between the first and second sides, such that the spring is adapted to wrap around and attach to windshield wiper assemblies having any of a variety of shapes and sizes, and used to increase the pressure between a windshield wiper arm and a windshield of a vehicle.

The spring has the first hook section include a proximal arm, a distal arm, and an arcuate bight therebetween, thereby forming its U-shape; and wherein the proximal arm and a distal arm both define axes that are parallel to one another; and wherein the intermediate coil section defines an axis that is perpendicular to the axes of the proximal arm and a distal arm of the first hook section.

The spring has the convolution of the U-shape of the second hook section formed as a distortion of the U-shape in the direction of the axis of the connector section.

The spring has the second hook section include a proximal arm, a distal arm, and an arcuate bight therebetween, thereby forming its U-shape; wherein the U-shape of the first hook section and the U-shape of the second hook section form respective opening sides that face in the same direction; and wherein the first and second hook sections are adapted to engage the windshield wiper assembly on top, bottom, and one side portion therebetween, and the intermediate coil section is adapted to engage a side portion of the windshield wiper assembly opposite the one side portion, such that the spring is adapted to engage completely around an outer circumference of the windshield wiper assembly.

The spring has the first hook section and the intermediate coil adapted to be placed upon the drive arm of the windshield wiper assembly, and wherein the axis of the intermediate coil is adapted to be placed in a parallel position to an axis defined by a pivot axis between the drive arm and the wiper arm of the windshield wiper assembly.

The spring has a resilient rod which is formed from a resilient material chosen from a list of resilient materials comprising metal and plastic.

In an alternate embodiment, the second hook section includes a proximal arm, a side arm, and an arcuate bight therebetween, such that the second hook section is adapted to be placed on the windshield wiper arm such that it does not extend to an underside opposite the third side of the wiper arm and thereby will not do any damage to an underside thereof, such that the first hook section is adapted to engage the windshield wiper drive arm on a top, bottom, and the one side portion therebetween, the intermediate coil section is adapted to engage a side portion of the windshield wiper assembly opposite the one side portion, and the second hook section is adapted to engage the windshield wiper arm on only a top side and the one side portion thereof.

In combination. a windshield wiper assembly for a vehicle and an add-on wiper spring, the combination comprising a windshield wiper for a vehicle, the wiper including a drive arm, a wiper arm, and pivot member therebetween defining a pivot axis, and a spring member connected between the drive arm and the wiper arm biasing the wiper arm in a pivotal motion with respect to the drive arm; and an add-on wiper spring comprising a resilient rod having a plurality of sections adapted to removably attach to the windshield wiper assembly, the rod including a first hook section at one end section thereof; a second hook section located at an opposite end section thereof; an intermediate coiled section attached to and located adjacent the first hook section; and a connector section defining an axis along its length and connected between the intermediate coiled section and the second hook section; the first hook section is substantially U-shaped and is adapted to removably attach to a drive arm of the windshield wiper assembly; the second hook section having a convoluted U-shape and is adapted to removably attach to the wiper arm of the windshield wiper assembly; and wherein the rod is bent such that the first and second hook sections are adapted to be placed on a first side of the windshield wiper assembly, the intermediate coil is adapted to be placed on a second side of the windshield wiper assembly opposite the first side, and the connector section being adapted to be placed on a third side of the windshield wiper assembly in between the first and second sides, such that the spring is adapted to partially wrap around and attach to windshield wiper assemblies having any of a variety of shapes and sizes, and used to increase the pressure between the windshield wiper arm and a windshield of a vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIGS. 4a-b Vertical cross-sectional view and partial side elevation of the spring mounted on a first wiper assembly configuration.

FIGS. 5a-b Vertical cross-sectional view and partial side elevation of the spring mounted on a second wiper assembly configuration.

FIGS. 6a-b Vertical cross-sectional view and partial side elevation of the spring mounted on a third wiper assembly configuration.

FIGS. 7a-b Vertical cross-sectional view and partial side elevation of the spring mounted on a fourth wiper assembly configuration.

FIG. 8 Perspective view of a spring in accordance with a second embodiment, shown in a first installation step thereof onto a windshield wiper assembly.

FIG. 9 Perspective view of the spring of FIG. 8, showing the spring in a second installation step thereof onto the windshield wiper assembly.

DETAILED DESCRIPTION OF THE PREFERRED EMBODIMENT

A wiper spring S made of a resilient rod made of a sturdy, waterproof material such as plastic or metal. The rod is bent to form various sections of the wiper spring S, as described hereinbelow. W denotes a conventional windshield wiper assembly onto which the wiper spring S is to be mounted.

As it is well known, the windshield wiper assembly W include a drive shaft (not shown) mounted on a body of the vehicle, below the windshield, and the drive shaft is motor-driven. The windshield wiper assembly W also includes a drive arm 10 mounted on the drive shaft for rotation therewith, and a wiper arm 12. The wiper arm 12 is pivotally mounted to the drive arm 10 at hinge 14, and carries a wiper blade 16 adapted to be in contact with the windshield. The drive arm 10 and the wiper arm 12 are spring loaded such that the wiper arm 12 and thus the wiper blade 16 are urged into contact with the windshield. More particularly, a helical spring or coil spring (not shown) extends between the drive arm 10 and the wiper arm 12, on the underside of the windshield wiper assembly W. The hinge 14 connecting the drive arm 10 and the wiper arm 12 is located between the attachment points of the helical spring to the drive arm 10 and the wiper arm 12. The drive shaft when actuated imparts a back-and-forth movement to the drive arm 10 and thus to the wiper arm 12 thereby causing the wiper blade 16 to clear the windshield of rain, snow, bugs, road dust, and the like.

Figure 2:
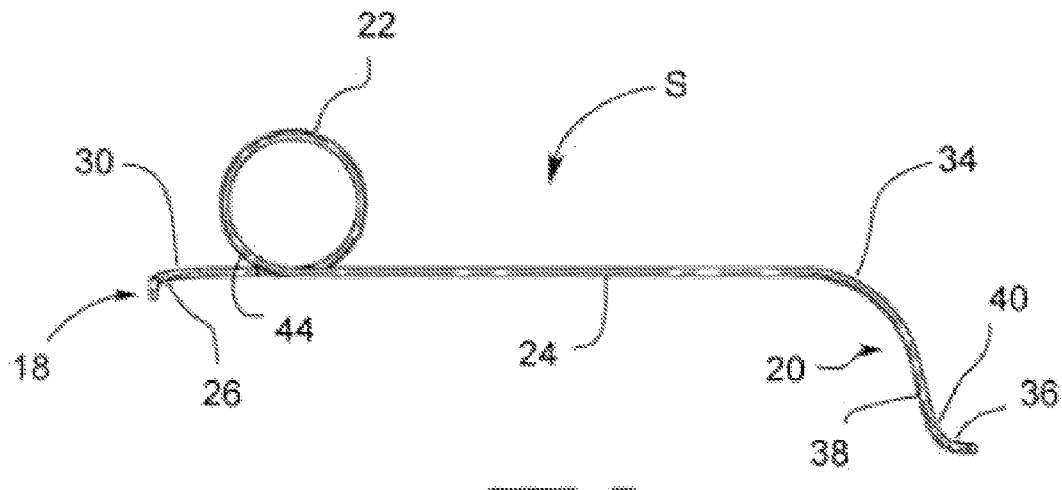
FIG. 2 Side elevation view of the spring of FIG. 1, but shown in an at rest position.
Figure 3:
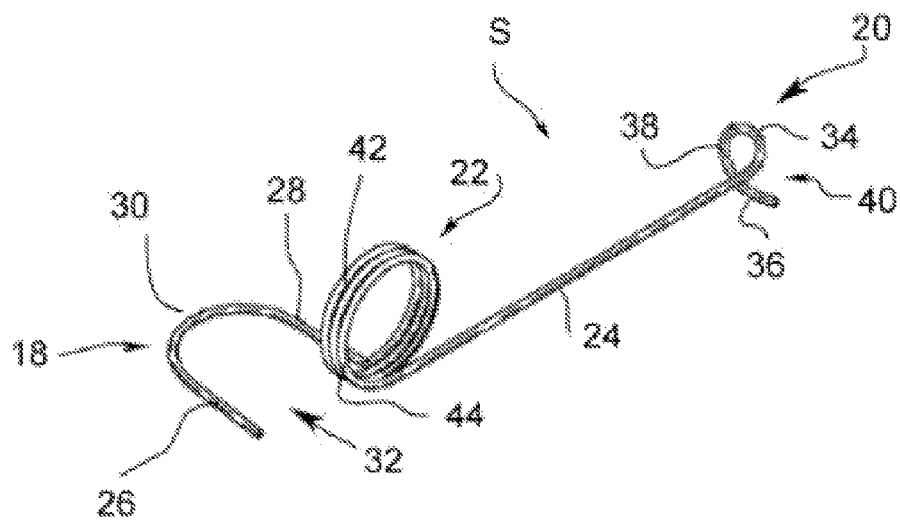
FIG. 3 Perspective view of the spring FIGS. 1 and 2 shown in the at rest position.
Figure 10:
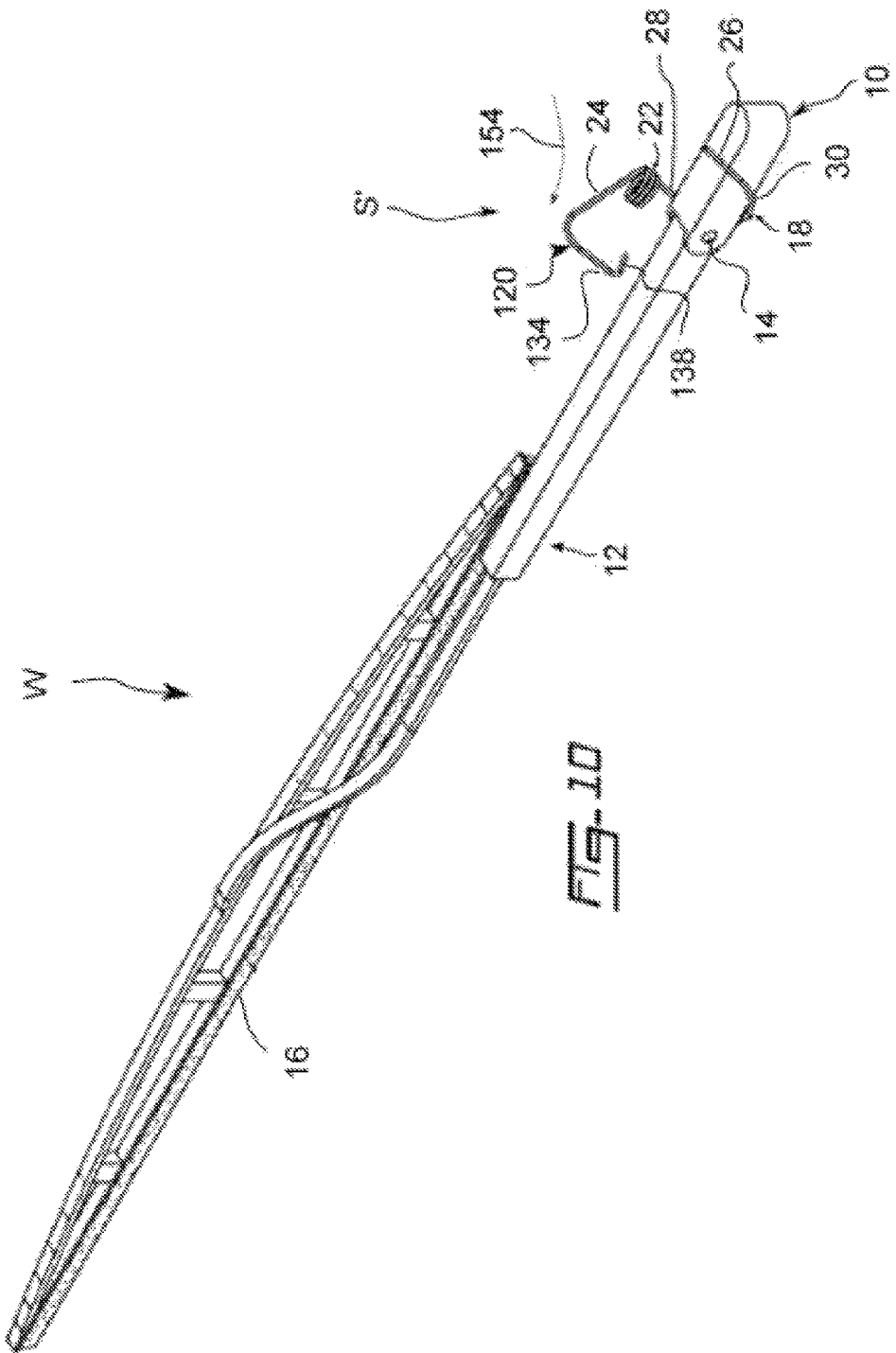
FIG. 10 Perspective view of the spring of FIG. 8, showing the spring in a third installation step thereof onto the windshield wiper assembly.
Figure 11:
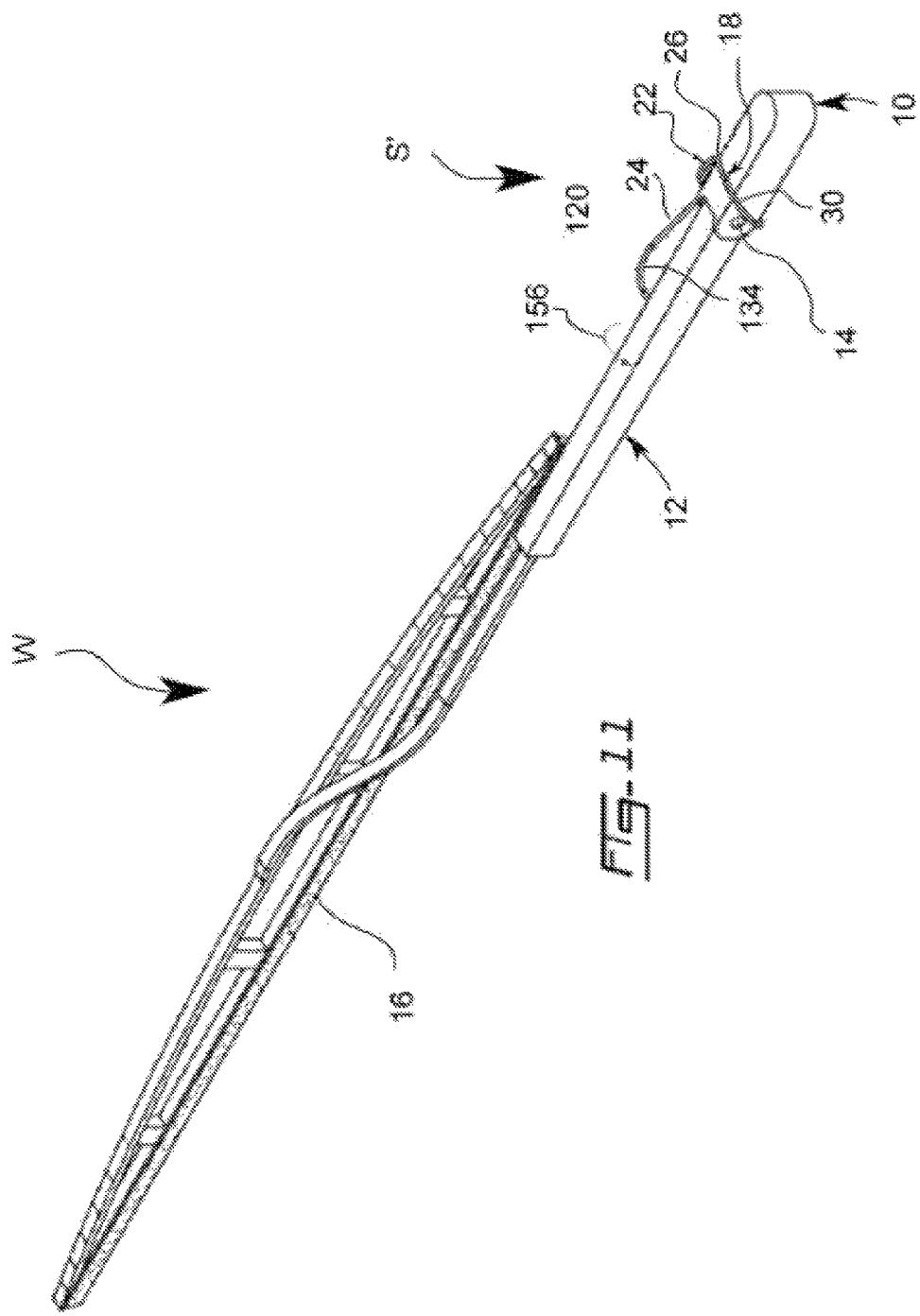
FIG. 11 Perspective view of the spring of FIG. 8, showing the spring in a fourth installation step thereof onto the windshield wiper assembly.

As best seen in FIGS. 2 and 3, the wiper spring S includes first and second hook sections 18 and 20, respectively, provided at opposed ends of the wiper spring S. An intermediate coiled section 22 is provided between the first and second hook sections 18 and 20. The coiled section 22 is located adjacent the first hook section 18, whereas it is connected to the second hook section 20 by a connector section 24.

The first hook section 18, which is substantially U-shaped, includes a proximal arm 26, a distal arm 28 and an arcuate bight 30 connecting the proximal and distal arms 26 and 28. The proximal and distal arms 26 and 28 are substantially straight and extend substantially parallelly one to the other and to the axis of the coiled section 22. The distal arm 28 of the first hook section 18 typically extends directly from an inner convolution 42 of the coiled section 22. The proximal arm 26, the distal arm 28 and the bight 30 define an open side 32.

The second hook section 20 defines a curved or somewhat convoluted U-shape, which is stretched along an axial direction of the wiper spring S. The second hook section 20 includes a proximal arm 34, a distal arm 36 and an arcuate bight 38 connecting the proximal and distal arms 34 and 36. The proximal arm 34, the distal arm 36 and the bight 38 define an open side 40.

The connector section 24 extends from an outer convolution 44 of the coiled section 22 to the proximal arm 34 of the second hook section 20. The connector section 24 is generally tangent to the outer convolution 44 of the coiled section 22.

The wiper spring S is adapted to be mounted on a conventional wiper assembly W with the first hook section 18 engaging the drive arm 10, whereas the second hook section 20 engages the wiper arm 12, as will be described in more details hereinbelow.

When the wiper spring S is mounted onto the wiper assembly W, the coiled section 22 is disposed on one side of the drive arm 10 and wiper arm 12 (see FIG. 1) in the region of the pivotal axis of the hinge 14 and with the axis of the coiled section 22 being generally parallel to this hinge axis.

The two bights 30 and 38 extend over the sides of the drive arm 10 and wiper arm 12, which are opposite to the coiled section 22. The proximal arm 26 and the distal arm 28 extend transversely of the drive arm 10 and are applied respectively against the top side and the underside of the drive arm 10.

Similarly, the proximal arm 34 and the distal arm 36 of the second hook section 20 extend transversely of the wiper arm 12 with the proximal arm 34 and the distal arm 36 bearing respectively against the top side and the underside of the wiper arm 12.

The provision of the coiled section 22 including several convolutions enables the wiper arm 12 to pivot at least through 90 degrees with respect to the drive arm 10 without the spring S reaching its elastic limit and breaking. Also, the several convolutions of the coiled section 22 result in a spring S which applies a great pressure on the wiper arm 12.

FIGS. 4 to 7 illustrate the wiper spring S mounted to windshield wiper assemblies of different configurations and, more particularly, to drive arms 10 of different cross-sectional dimensions, as seen by the hatched lines ion FIGS. 4a, 5a, 6a and 7a. Therefore, the wiper spring S can be installed onto various types of wiper assemblies W (e.g. having different sizes), as opposed to having to resort to a number of models of springs, each of different configuration so as to accommodate specific configurations of wiper assemblies W. The ability of the present wiper spring S to be installable on various models of windshield wiper assemblies W results mainly from the configuration of the first hook section 18 and, more particularly, of the arcuate bight 30 thereof. This characteristic will be explained in more details hereinafter when a second embodiment of the wiper spring is described with reference to FIGS. 8 to 17.

Now referring to FIGS. 8 to 17, a second wiper spring S' will now be described.

Figure 12:
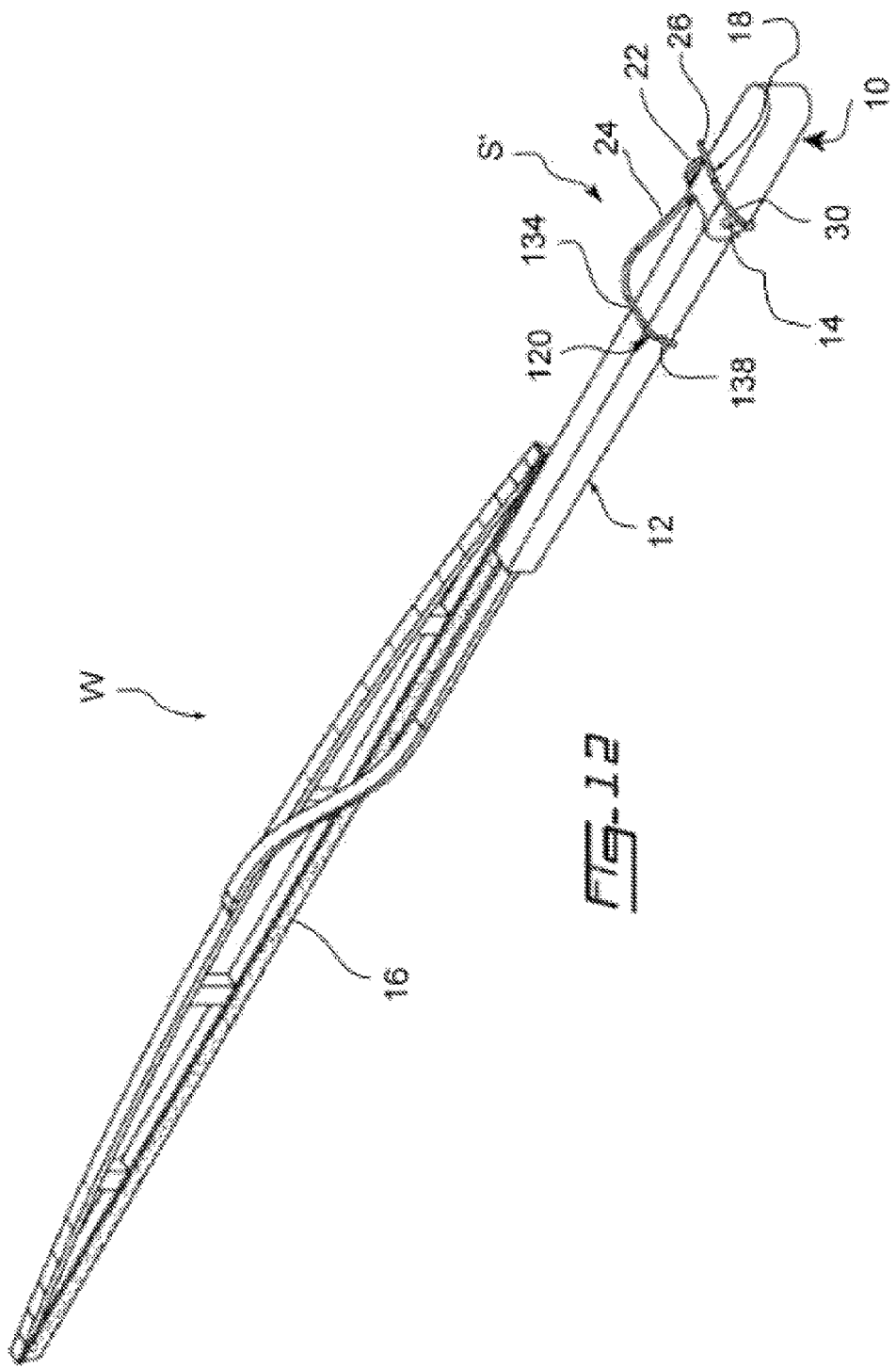
FIG. 12 Perspective view of the spring of FIG. 8, showing the spring in a fifth and final installation step thereof onto the windshield wiper assembly.
Figure 13:
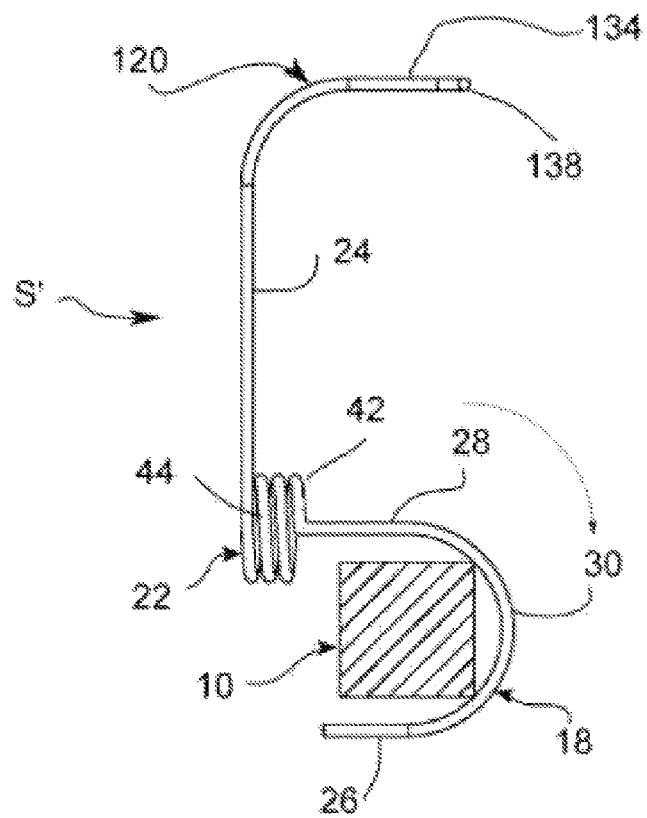
FIGS. 13 to 17 Schematic vertical cross-sectional views showing the spring of FIG. 8 in successive steps being mounted to the windshield wiper assembly, these successive steps corresponding to those illustrated in FIGS. 8 to 12.
Figure 14:
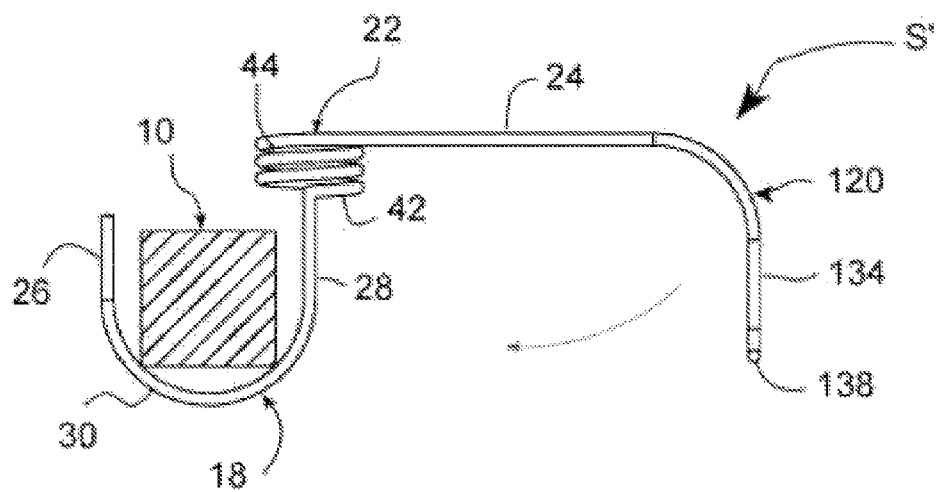
Figure 15:
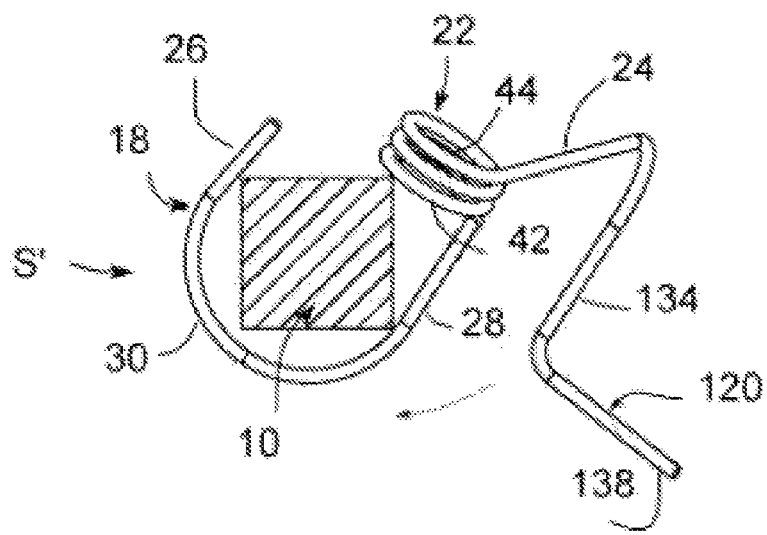
Figure 16:
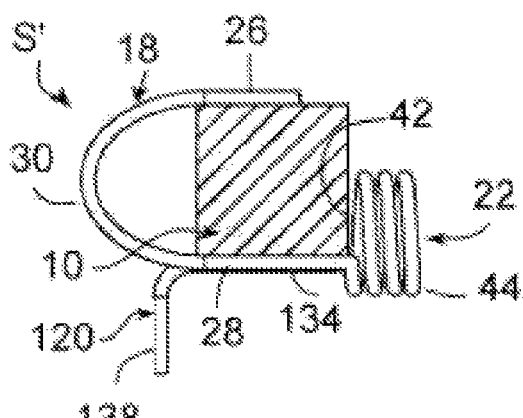
Figure 17:
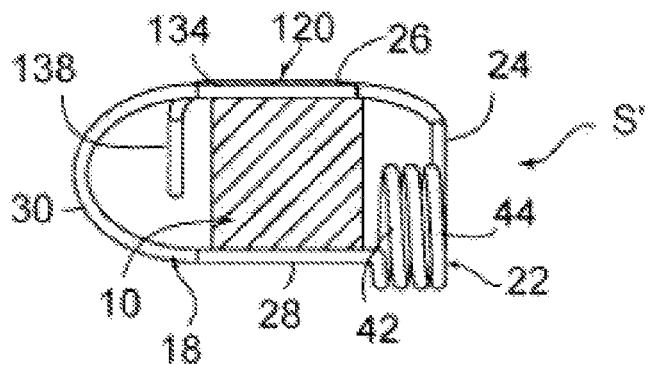

The second wiper spring S' is similar to the wiper spring S of FIGS. 1 to 7, except specifically for the second hook section 120 of the second spring S', which is of a different configuration than that of the second hook section 20 of the spring S. More particularly, the second hook section 120 includes a proximal arm 134 adapted to overlie the wiper arm 12, as seen in FIGS. 12 and 17, and further includes a side arm 138 adapted to extend alongside the wiper arm 12, as also seen in FIGS. 12 and 17. As opposed to the wiper spring S of FIGS. 1 to 7, the second hook section 120 of the spring S' does not extend under the wiper arm 12 thereby preventing the second hook section 120 from possibly damaging the wiper arm 12 (e.g. the paint thereof) during installation of the spring S'.

As opposed to the second hook section 20 of the spring S, the second hook section 120 of the second spring S' is not provided with a distal arm that would extend under the wiper arm 12. As seen in FIG. 12, the spring S' remains solidly installed to the wiper assembly W even without its second hook section 120 being devoid of a distal or lower arm. Indeed, in addition to the strong forces exerted downwardly by the first and second hook sections 18 and 120 respectively on the drive and wiper arms 10 and 12, the spring S' cannot easily displace sideways as it engages one side of the wiper assembly W with its coiled section 22 and the other side of the wiper assembly W with the bight 30 and side arm 138 respectively of the first and second hook sections 18 and 120 thereof.

FIGS. 8 to 12 show in sequential views the installation of the wiper spring S' onto the windshield wiper assembly W. In FIG. 8, the spring S' is first displaced along arrow 150, with the open end 32 of the first hook section 18 facing the drive arm 10 such that the first hook section 18 is engaged around the drive arm 10.

In FIG. 9, the spring S' is pivoted transversally 90 degrees along arrow 152. The spring S' is then pivoted in FIG. 10 generally along arrow 154 up to its position shown in FIG. 11, whereat the spring S' is displaced along 156 and against spring force such that the second hook section 120 is lifted and then brought transversally over the wiper arm 12 up to its final position shown in FIG. 12.

FIGS. 13 to 17 are schematic cross-sectional views showing the installation steps illustrated in FIGS. 8 to 12 respectively, but looking axially along the wiper assembly W, from the drive arm 10 towards the wiper arm 12 thereof, the vertical cross-section cutting through the drive arm 10 generally where the first hook section 18 is positioned. FIGS. 13 to 16 show how the first hook section 18 rotates around the drive arm 10 and, more particularly, how the rectangular cross-sectional shape of the drive arm 10 (i.e. the corners thereof) slides along the arcuate bight 30 of the first hook section 18. The final position of the first hook section 18 of either spring S or spring S' for drive arms of various dimensions and shapes can be seen in FIGS. 4a to 7a.

Accordingly, multiple rectangular transversal dimensions of drive arms of wiper assemblies can be accommodated by the configuration of the first hook section 18 in view of the arcuate portion thereof, as opposed for instance to the square hook portion 6,8,10 of U.S. Pat. No. 5,320,333.

Figure 1:
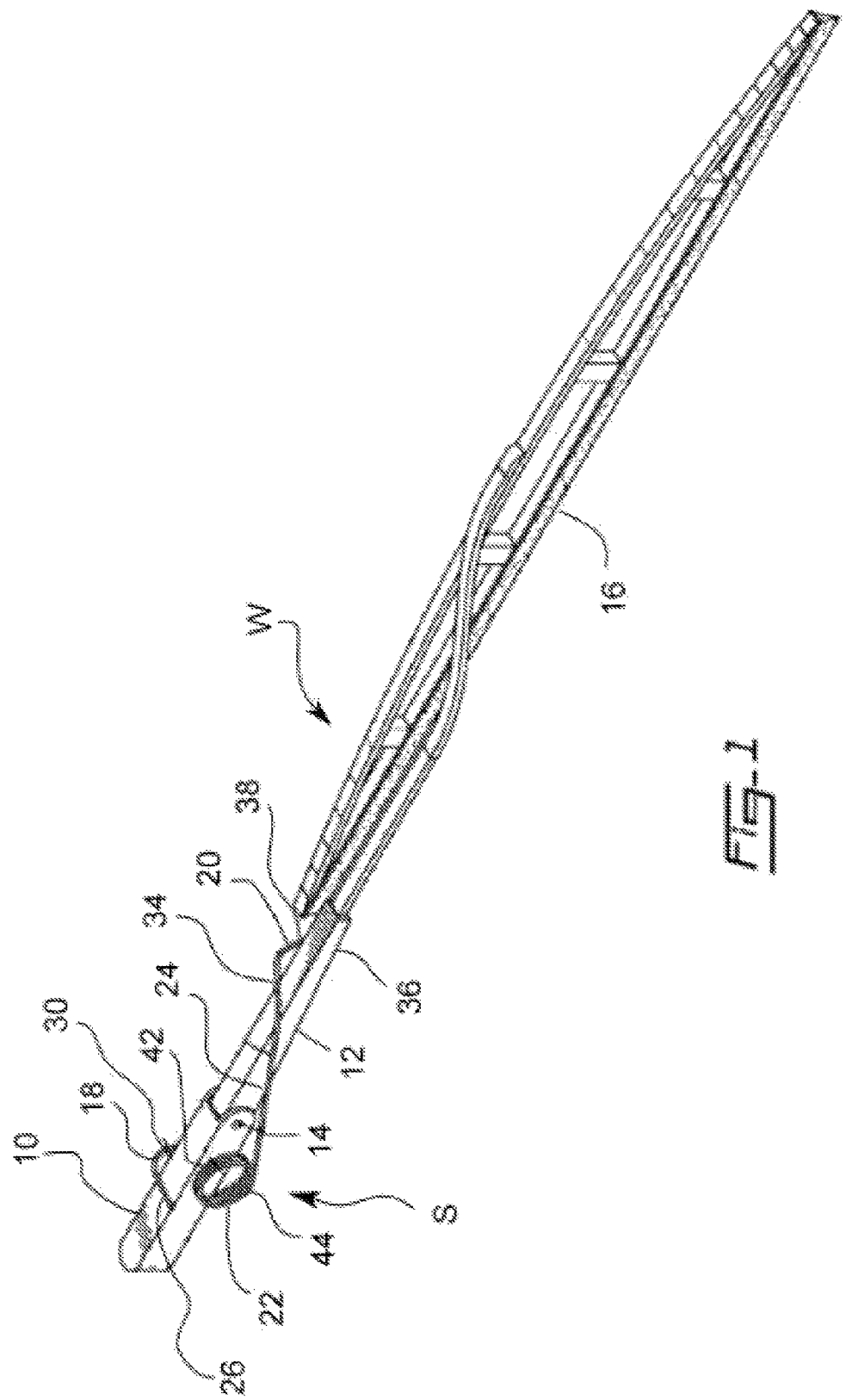
FIG. 1 Perspective view of a windshield wiper assembly provided with a spring in accordance with a first embodiment of the present invention, the spring being shown in a mounted position thereof on the wiper assembly.

It is noted that the installation of the spring S is similar to that of spring S', except that at the end of the installation of spring S, i.e. in FIG. 12, the distal arm 36 of the second hook section 20 of the spring S of FIGS. 1 to 7 must be brought underneath the wiper arm 12. This is done by forcing the second hook section 20 further along arrow 156 and up to a point where the distal arm 36 thereof can be lowered alongside the wiper arm 12. Once the distal arm 36 is below the wiper arm 12, the distal arm 36 can be allowed to biasedly move under the wiper arm 12 and assume its final position thereat, as seen in FIG. 1.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An elongated spring for windshield wipers comprising a resilient rod having a plurality of sections adapted to removably attach to a windshield wiper of an automobile, said rod including a first hook section at one end section thereof; a second hook section located at an opposite end section thereof; an intermediate coiled section attached to and located adjacent and closer to said first hook section than said second hook section; and an elongated connector section defining an axis along its length and connected between said intermediate coiled section and said second hook section; said first hook section is substantially U-shaped and is adapted to removably attach to a drive arm of said windshield wiper, said first hook section includes a proximal arm, a distal arm, and an arcuate bight therebetween, thereby forming its U-shape; and wherein said proximal arm and said distal arm both define axes that are parallel to one another; and wherein said intermediate coiled section defines an axis that is parallel to said axes of said proximal arm and said distal arm of said first hook section; said second hook section having a convoluted U-shape and is adapted to removably attach to a wiper arm of said windshield wiper, wherein said convolution of said U-shape of said second hook section is formed as a distortion of said U-shape in the direction of said axis of said connector section such that the second hook section includes spaced proximal and distal transverse arms with an arcuate bight therebetween to define its U-shape, the distal transverse arm thereof forming a terminal end of the spring wherein the entirety of the distal transverse arm is spaced longitudinally further from the intermediate coiled section along the connector section axis than the entirety of the proximal transverse arm, to thereby increase the ease as to which said spring can be attached and removed from said windshield wiper; and wherein said rod is bent such that said first hook section is adapted to contact and apply pressure upon a first side portion of said drive arm and a second side portion of said drive arm opposite from said first side portion, said second hook section is adapted to be placed and apply pressure upon a first side portion of said wiper arm parallel and in line with said first side portion of said drive arm, and said intermediate coiled section and said connector section are adapted to be placed adjacent to a side portion of said windshield wiper in between said first and second side portions of said drive arm and perpendicular to said first side portion of said wiper arm, such that said spring is adapted to wrap around and attach to windshield wipers having any of a variety of shapes and sizes, and used to increase the pressure between a windshield wiper arm and a windshield of an automobile.

2. The spring of claim 1, wherein the U-shape of said first hook section and the U-shape of said second hook section form respective opening sides that face in the same direction; and wherein said first and second hook sections are adapted to engage said windshield wiper on top, bottom, and one side portion therebetween, and said intermediate coiled section is adapted to engage a side portion of said windshield wiper opposite said one side portion, such that said spring is adapted to engage completely around an outer circumference of said windshield wiper.

3. The spring of claim 1, wherein said first hook section and said intermediate coiled section are adapted to be placed upon the drive arm of said windshield wiper, and wherein said axis of said intermediate coil is adapted to be placed in a parallel position to an axis defined by a pivot axis between said drive arm and said wiper arm of said windshield wiper.

4. The spring of claim 1, wherein said resilient rod is formed from a resilient material chosen from a list of resilient materials comprising metal and plastic.

5. A combination of a windshield wiper for an automobile and an add-on wiper spring, said combination comprising a windshield wiper for an automobile, said wiper including a drive arm, a wiper arm, and pivot member therebetween defining a pivot axis, and a spring member connected between said drive arm and said wiper arm biasing said wiper arm in a pivotal motion with respect to said drive arm; and an elongated add-on wiper spring comprising a resilient rod having a plurality of sections adapted to removably attach to said windshield wiper, said rod including a first hook section at one end section thereof; a second hook section located at an opposite end section thereof; an intermediate coiled section attached to and located adjacent and closer to said first hook section than said second hook section; and an elongated connector section defining an axis along its length and connected between said intermediate coiled section and said second hook section; said first hook section is substantially U-shaped and is adapted to removably attach to a drive arm of said windshield wiper, said first hook section includes a proximal arm, a distal arm, and an arcuate bight therebetween, thereby forming its U-shape; and wherein said proximal arm and said distal arm both define axes that are parallel to one another; and wherein said intermediate coiled section defines an axis that is parallel to said axes of said proximal arm and a distal arm of said first hook section; said second hook section having a convoluted U-shape and is adapted to removably attach to said wiper arm of said windshield wiper, wherein said convolution of said U-shape of said second hook section is formed as a distortion of said U-shape in the direction of said axis of said connector section such that the second hook section includes spaced proximal and distal transverse arms with an arcuate bight therebetween to define its U-shape, the distal transverse arm thereof forming a terminal end of the spring wherein the entirety of the distal transverse arm is spaced longitudinally further from the intermediate coiled section along the connector section axis than the entirety of the proximal transverse arm, to thereby increase the ease as to which said spring can be attached and removed from said windshield wiper; and wherein said rod is bent such that said first hook section is adapted to contact and apply pressure upon a first side portion of said drive arm and a second side portion of said drive arm opposite from said first side portion, said second hook section is adapted to be placed and apply pressure upon a first side portion of said wiper arm parallel and in line with said first side portion of said drive arm, and said intermediate coiled section and said connector section are adapted to be placed adjacent to a side portion of said windshield wiper in between said first and second side portions of said drive arm and perpendicular to said first side portion of said wiper arm, such that said spring is adapted to wrap around and attach to windshield wipers having any of a variety of shapes and sizes, and used to increase the pressure between said windshield wiper arm and a windshield of an automobile.

6. The combination of claim 5, wherein the U-shape of said first hook section and the U-shape of said second hook section form respective opening sides that face in the same direction; and wherein said first and second hook sections are adapted to engage said windshield wiper on top, bottom, and one side portion therebetween, and said intermediate coiled section is adapted to engage a side portion of said windshield wiper opposite said one side portion, such that said spring is adapted to engage completely around an outer circumference of said windshield wiper.

7. The combination of claim 5, wherein said first hook section and said intermediate coiled section are adapted to be placed upon the drive arm of said windshield wiper, and wherein said axis of said intermediate coil is adapted to be placed in a parallel position to an axis defined by a pivot axis between said drive arm and said wiper arm of said windshield wiper.

8. The spring of claim 5, wherein said resilient rod is formed from a resilient material chosen from a list of resilient materials comprising metal and plastic.

* * * * *